(12) United States Patent
Sawada et al.

(10) Patent No.: US 12,111,444 B2
(45) Date of Patent: Oct. 8, 2024

(54) OPTICAL ELEMENT

(71) Applicant: PANASONIC INTELLECTUAL PROPERTY MANAGEMENT CO., LTD., Osaka (JP)

(72) Inventors: Akito Sawada, Osaka (JP); Masaki Hashimoto, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 638 days.

(21) Appl. No.: 17/287,463

(22) PCT Filed: Jun. 11, 2020

(86) PCT No.: PCT/JP2020/023874
§ 371 (c)(1),
(2) Date: Apr. 21, 2021

(87) PCT Pub. No.: WO2020/251060
PCT Pub. Date: Dec. 17, 2020

(65) Prior Publication Data
US 2021/0389507 A1  Dec. 16, 2021

(30) Foreign Application Priority Data

Jun. 14, 2019  (JP) .................. 2019-111276

(51) Int. Cl.
*G02B 1/14* (2015.01)
*G02B 1/04* (2006.01)
(Continued)

(52) U.S. Cl.
CPC .............. *G02B 1/14* (2015.01); *G02B 1/04* (2013.01); *G02B 1/18* (2015.01); *G02B 13/001* (2013.01);
(Continued)

(58) Field of Classification Search
CPC ... G02B 1/14; G02B 1/04; G02B 1/18; G02B 13/001; G02B 1/115; B60R 11/04; G08B 13/196
(Continued)

(56) References Cited

U.S. PATENT DOCUMENTS

2005/0219724 A1* 10/2005 Teramoto ............... G02B 1/113
2009/0161219 A1  6/2009 Ishizawa et al.
(Continued)

FOREIGN PATENT DOCUMENTS

| JP | 2004-205721 A | 7/2004 |
| JP | 2005-208195 A | 8/2005 |

(Continued)

OTHER PUBLICATIONS

English translation of the International Preliminary Report on Patentability issued in International Application No. PCT/JP2020/023874, dated Dec. 23, 2021
(Continued)

*Primary Examiner* — Ricky D Shafer
(74) *Attorney, Agent, or Firm* — Rimon P.C.

(57) ABSTRACT

There is provided an optical element comprising a base material comprising a resin material and a stack covering of layers disposed on the base material. In the optical element of the present disclosure, the stack covering comprises an optical multi-layered part composed of a high refractive index layer comprising $Ta_2O_5$ and a low refractive index layer comprising $SiO_2$, the high refractive index layer and the low refractive index layer being alternately stacked in a form of 4 or more layers. Of a plurality of high refractive index layers, a first high refractive index layer situated most closely to the base material has a fissured structure.

14 Claims, 8 Drawing Sheets

(51) Int. Cl.
*G02B 1/18* (2015.01)
*G02B 13/00* (2006.01)
*B60R 11/04* (2006.01)
*G02B 1/115* (2015.01)
*G08B 13/196* (2006.01)

(52) U.S. Cl.
CPC ............... *B60R 11/04* (2013.01); *G02B 1/115* (2013.01); *G08B 13/196* (2013.01)

(58) Field of Classification Search
USPC .......................................................... 359/507
See application file for complete search history.

(56) References Cited

U.S. PATENT DOCUMENTS

| | | |
|---|---|---|
| 2011/0217532 A1 | 9/2011 | Deguchi et al. |
| 2011/0217556 A1 | 9/2011 | Deguchi et al. |
| 2012/0081792 A1* | 4/2012 | Neuffer ................ G02C 7/02 |
| 2013/0050636 A1 | 2/2013 | Fukagawa et al. |
| 2013/0143028 A1* | 6/2013 | Asahi ................... G02B 1/111 |
| 2015/0138638 A1* | 5/2015 | Mashimo ................ G02B 1/18 |
| 2015/0338552 A1 | 11/2015 | Fujii et al. |
| 2018/0185875 A1 | 7/2018 | Murakami et al. |
| 2020/0206709 A1* | 7/2020 | Leclaire ............... B01J 13/0047 |

FOREIGN PATENT DOCUMENTS

| | | |
|---|---|---|
| JP | 2005-292462 A | 10/2005 |
| JP | 2007-094150 A | 4/2007 |
| JP | 2010-248580 A | 11/2010 |
| JP | 2011-150267 A | 8/2011 |
| JP | 2011-186144 A | 9/2011 |
| JP | 2011-186149 A | 9/2011 |
| JP | 2011-242697 A | 12/2011 |
| JP | 2012141474 A * | 7/2012 |
| JP | 2017-173658 A | 9/2017 |
| JP | 2019-066600 A | 4/2019 |
| WO | 2008/001675 A1 | 1/2008 |
| WO | 2014/129333 A1 | 8/2014 |
| WO | 2017/038868 A1 | 3/2017 |

OTHER PUBLICATIONS

International Search Report and Written Opinoin issued in International Patent Application No. PCT/JP2020/023874, dated Jul. 21, 2020; with pariial English translation.

Notice of Reasons for Refusal dated May 21, 2024 issued in the corresponding Japanese Patent Application No. 2021-526181, with English machine translation.

Decision of Refusal dated Aug. 20, 2024 issued in the corresponding Japanese Office Action No. 2021-526181, with English machine translation.

* cited by examiner

OPTICAL ELEMENT

CROSS-REFERENCE OF RELATED APPLICATIONS

This application is the U.S. National Phase under 35 U.S.C. § 371 of International Patent Application No. PCT/JP2020/023874, filed on Jun. 11, 2020, which in turn claims the benefit of Japanese Application No. 2019-111276, filed on Jun. 14, 2019, the entire disclosures of which Applications are incorporated by reference herein.

TECHNICAL FIELD

The present disclosure relates to an optical element. Specifically, it relates to the optical element having a stack covering on a base material of the element.

BACKGROUND ART

From the viewpoint of moldability and manufacturing cost, optical elements in which a resin material is used for a base material have been proposed. As such optical elements, there is disclosed an optical element having an improved scratch resistance due to an increased film density of an optical thin film formed on a resin substrate (see Patent Document 1), and also an optical element whose degradation attributed to environmental changes is suppressed (see Patent Document 2).

PATENT DOCUMENT (RELATED ART PATENT DOCUMENT)

PATENT DOCUMENT 1: JP-A-2011-186149
PATENT DOCUMENT 2: JP-A-2011-186144

SUMMARY OF THE INVENTION

Problems to be Solved by the Invention

It is an object of the present disclosure to provide an optical element having more improved antiweatherability.

Means for Solving the Problems

The optical element according to the present disclosure comprises a base material comprising a resin material, and a stack covering provided on the base material. The stack covering of the optical element has an optical multi-layered part of four or more layers in total wherein high refractive index layers comprising $Ta_2O_5$ and low refractive index layers comprising $SiO_2$ are alternately stacked. In the optical element according to the present disclosure, as one of the high refractive index layers, a first high refractive index layer that is situated most closely to the base material has a fissured structure.

Effect of the Invention

The optical element of the present disclosure has more improved antiweatherability. Specifically, such more improved antiweatherability is given by the presence of the fissured structure of the first high refractive index layer that is situated most closely to the base material on which the optical multi-layered part is provided.

MODES FOR CARRYING OUT THE INVENTION

[Findings on which the Present Disclosure is Based]

Conventionally, optical elements comprising a resin material have been used for various applications. For example, they are used as optical fibers, lens, and the like.

In recent years, such optical elements have been used also in the field of exterior parts. For example, the optical elements are used for surveillance systems for disaster prevention and/or crime prevention, or as exterior lenses such as ones for vehicle-mounted cameras.

When the optical element is used for the exterior lens, it is important for such optical element to have desired antiweatherability or the like.

The inventors of the present application have realized that there are still problems to be overcome with the conventional optical elements, and have found out the need to take measures therefor. Specifically, the inventors of the present application have found out that the conventional optical elements have the following problems.

An optical element can have a base material on which a covering with its various characteristics may be formed by a coating method, a vapor deposition method or the like. For example, it is possible to provide the optical element that is superior in antireflection properties by forming an optical thin film on the surface of the optical element such that high refractive index layers and low refractive index layers are alternately stacked in the optical thin film. In the optical element having the optical thin film, it is conceivable to improve antiweatherability of the optical element by increasing a film density of the optical thin film.

Figure 8:
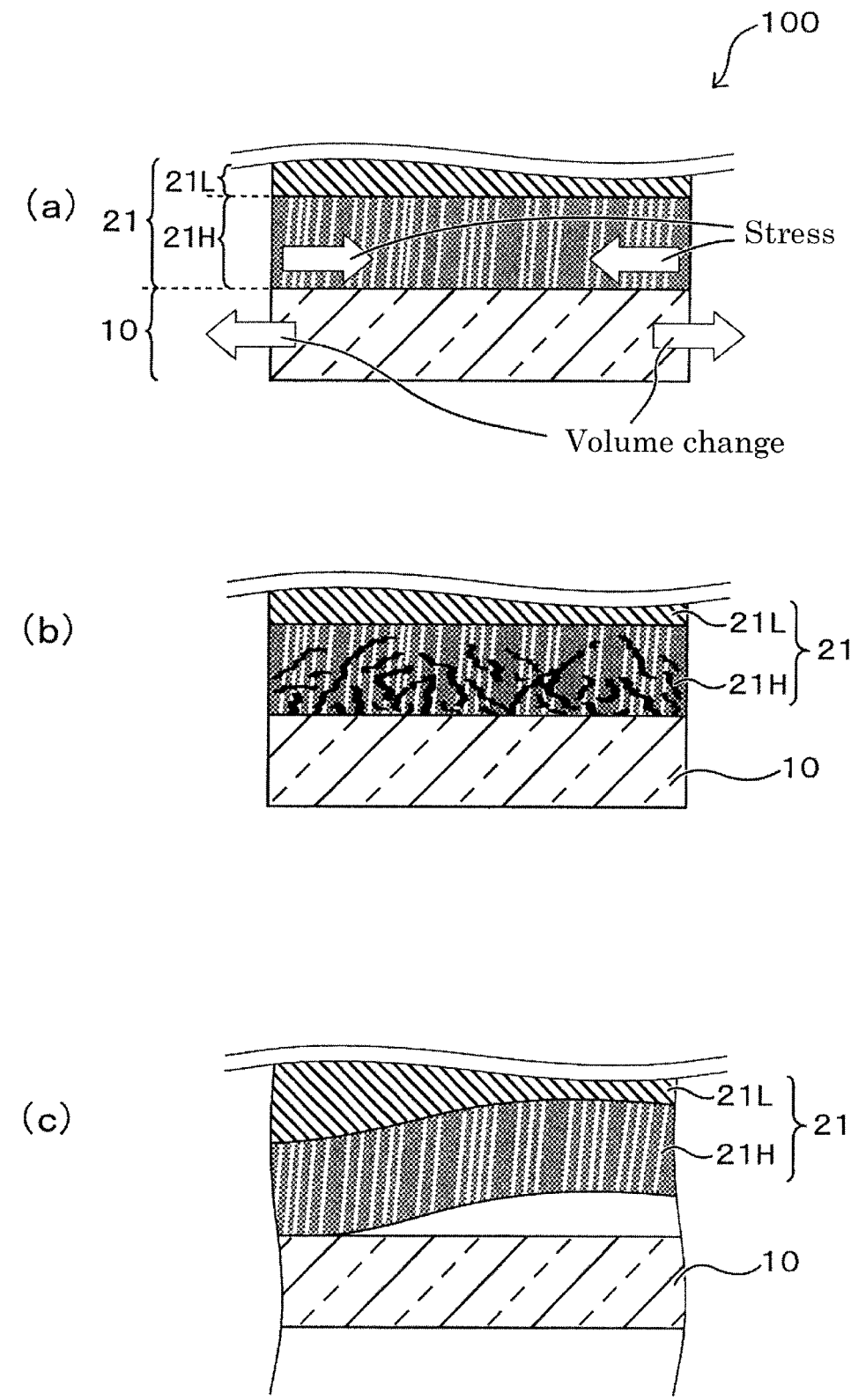
FIG. 8 is schematic cross-sectional views for explaining a problem associated with a conventional optical element.

However, there is a case where such thin film of the optical element does not have sufficient antiweatherability against a severer environment. For example, the antiweatherability in this optical element may be not sufficient in an environment of a high temperature and a high humidity. More specifically, under the high temperature and the high humidity, the optical thin film 21 may suffer from a cracking or a delamination due to the stress caused by the difference in the volume-change rate between a resin base material 10 and the densely formed optical thin film 21 thereon (see FIG. 8). In particular, the inventors of the present application have found out that the stress generated by the difference in the volume change rate between the resin base material 10 and the high refractive index layer 21H situated most closely to the resin base material 10 is more likely to cause the crack or the peeling/delamination in the optical thin film 21.

Accordingly, when the optical element is put under a severe usage environment to be used as the exterior parts (for example, used for a vehicle-mounted camera installed outside the vehicle, a surveillance camera installed outdoors, etc.), the desired performance may not be given.

The inventors of this application have attempted to address the problems described above, from a novel standpoint rather than a continual standpoint of the conventional art. As a result, the inventors of this application have created an optical element that is capable of attaining the main object described above.

Hereinafter, the optical element according to the present disclosure will be described in more detail. In some cases, however, a specific description more than necessary will not be given. For example, a detailed description on a well-known matter, or a duplicate description on a substantially identical structure/configuration will not be given in some cases. This is because of avoiding a description redundant more than necessary and thus facilitating the better understanding of those skilled in the art.

The applicant provides the attached drawings and the following description in order for those skilled in the art to sufficiently understand the present disclosure, but they are not intended to limit the subject matter of the disclosure to the claims. In the drawings, constituent parts/members/elements are schematically exemplified for the understanding of an optical element and a manufacturing method therefor according to the present disclosure, and thus can be different from actual ones in terms of, for example, outer appearance and dimensional ratio.

The term "cross section"/"cross sectional" as used herein is based on a virtual cross section taken along a thickness direction or an in-plane direction of an optical element. In this regard, "cross section" in the sense of "cross-sectional view" refers to one taken along the thickness direction of the optical element, and thus a cross-sectional view in the present disclosure can correspond to a view of such cross section. Typically, the "thickness direction of optical element" can correspond to a direction in which light transmits through the optical element. While on the other hand, "cross section" in the sense of "plane-sectional view" refers to one taken along the in-plane direction of the optical element (i.e., along the direction orthogonal to the thickness direction), and thus a plane-sectional view in the present disclosure can correspond to a view of such cross section.

Numerical ranges as used herein are meant to include the lower and upper limits themselves. That is, taking the numerical range of 1 to 10 just as an example, it can be interpreted as including the lower limit value of "1" and the upper limit value of "10".

[Features of Optical Element of the Present Disclosure]

An optical element of the present disclosure is such that a stack covering is provided on a base material comprising a resin material and the optical element is featured by a configuration of an optical multi-layered part in the stack covering.

More specifically, the optical element according to the present disclosure comprises the base material comprising the resin material, and the stack covering located on the base material. The stack covering of the optical element has the optical multi-layered part in which a high refractive index layer comprising a tantalum oxide and a low refractive index layer comprising a silicon oxide are stacked. The high refractive index layer and the low refractive index layer may be alternately stacked on each other. Preferably, the stack covering has the optical multi-layered part in which the high refractive index layers comprising $Ta_2O_5$ (i.e., tantalum pentoxide) and the low refractive index layers comprising $SiO_2$ (i.e., silicon dioxide) are alternately stacked on each other such that the stacking consists of four or more layers in total. Among such high refractive index layers, a first high refractive index layer that is situated most closely to the base material has a fissured structure.

Figure 1:
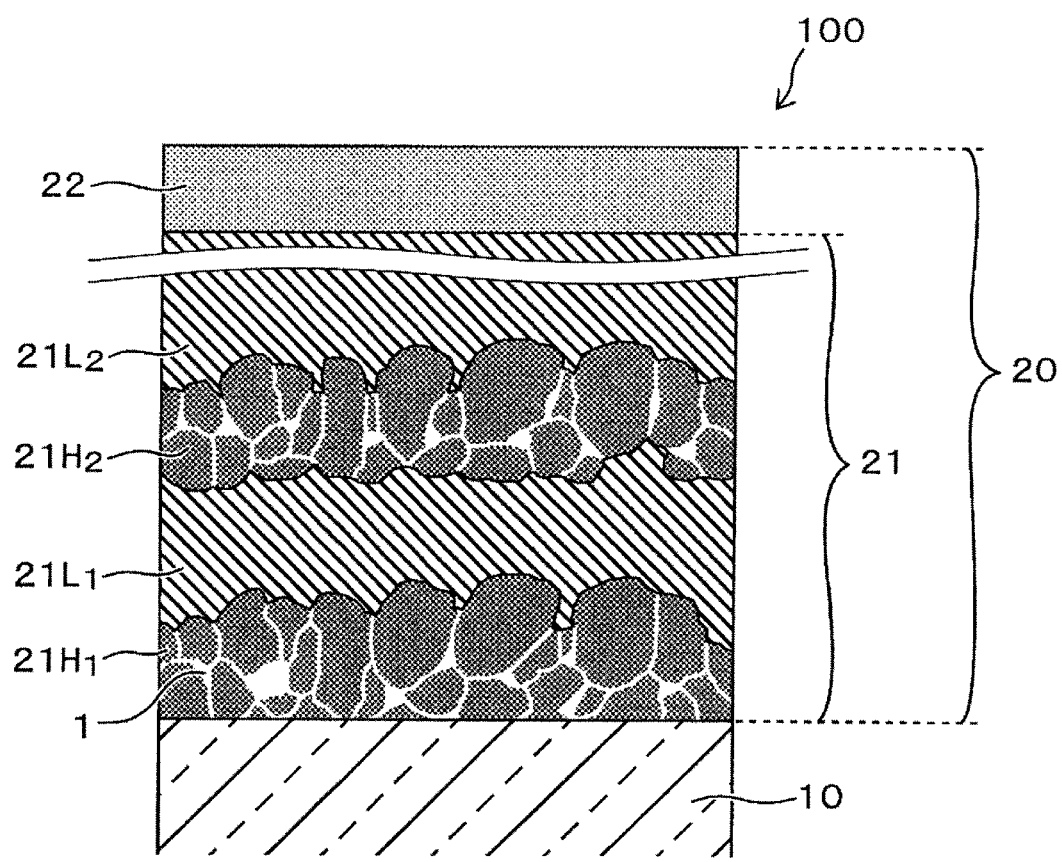
FIG. 1 is a schematic cross-sectional view showing an optical element according to one embodiment of the present disclosure.

In an exemplary embodiment shown in FIG. 1, the optical element 100 has the optical multi-layered part 21 in which the alternate stacking of the high refractive index layers 21H comprising $Ta_2O_5$ and the low refractive index layers 21L comprising $SiO_2$ is provided as a stacking of four or more layers in total on the base material 10 comprising the resin. Of the high refractive index layers, at least the first high refractive index layer $21H_1$ that is situated most closely to the base material 10 has the fissured structure 1.

The fissured structure 1 of the first high refractive index layer $21H_1$ can absorb a stress generated in the optical element 100 (see FIG. 1). In other words, the fissured structure 1 can serve as a buffer for a deformation of the first high refractive index layer $21H_1$, and thereby the first high refractive index layer $21H_1$ can follow a deformation of the base material 10.

As will be described later, it is preferred that the fissured structure 1 has a relatively low molecular density in the high refractive index layer. As a result, the first high refractive index layer $21H_1$ with the fissured structure 1 therein has a lower film density than that of the layer with no fissured structure 1 therein. Such first high refractive index layer $21H_1$ can have a lower rigidity than that of the layer having no fissured structure 1.

The first high refractive index layer $21H_1$ having the fissured structure 1 as described above allows the stress that can be generated in the optical multi-layered part 21 to be reduced, which can prevent the crack or the peeling/delamination in the optical multi-layered part 21. Accordingly, the optical element 100 can be more improved in its antiweatherability.

As used herein, the term "optical element" means, in a broader sense, a member through which light is transmittable. Thus, the optical element is a lens, a prism or a mirror, for example. Moreover, the optical element may also be, for example, a window product associated with a light transmission.

The "high refractive index layer" in the present disclosure refers to a layer having a refractive index of more than 1.7 at 500 nm. While on the other hand, the "low refractive index layer" in the present disclosure refers to a layer having a refractive index of less than 1.6 at 500 nm.

In a broader sense, the "fissured structure" in the present disclosure means a form of layer provided as the high refractive index layer, the form being one that can be seen as if there is such a rift structure that the layer is at least partially rifted in a cross-sectional view of an electron microscope image. Preferably, such rift structure of the high refractive index layer is due to the difference in molecular density in the high refractive index layer concerned. In this regard, the "fissured structure" in the present disclosure refers to a low molecular density part which is positioned between respective ones of high molecular density parts in the high refractive index layer, the low molecular density part having a relatively lower molecular density of $Ta_2O_5$, the high molecular density parts each having a relatively higher molecular density of $Ta_2O_5$.

The phrase "most closely to" in the present disclosure refers to a location of being at the closest position in a cross-sectional view shown in FIG. 1, etc. That is, in such a cross-sectional view, the first high refractive index layer can correspond to a layer selected among a plurality of the high refractive index layers of the optical multi-layered part, the layer being located at the closest position with respect to the base material. As will be described later, the first high refractive index layer may be in direct contact with the base material, but is not necessarily limited to that. The first high refractive index layer may also be located such that another layer or the like is interposed between the first high refractive index layer and the base material.

Figure 2:
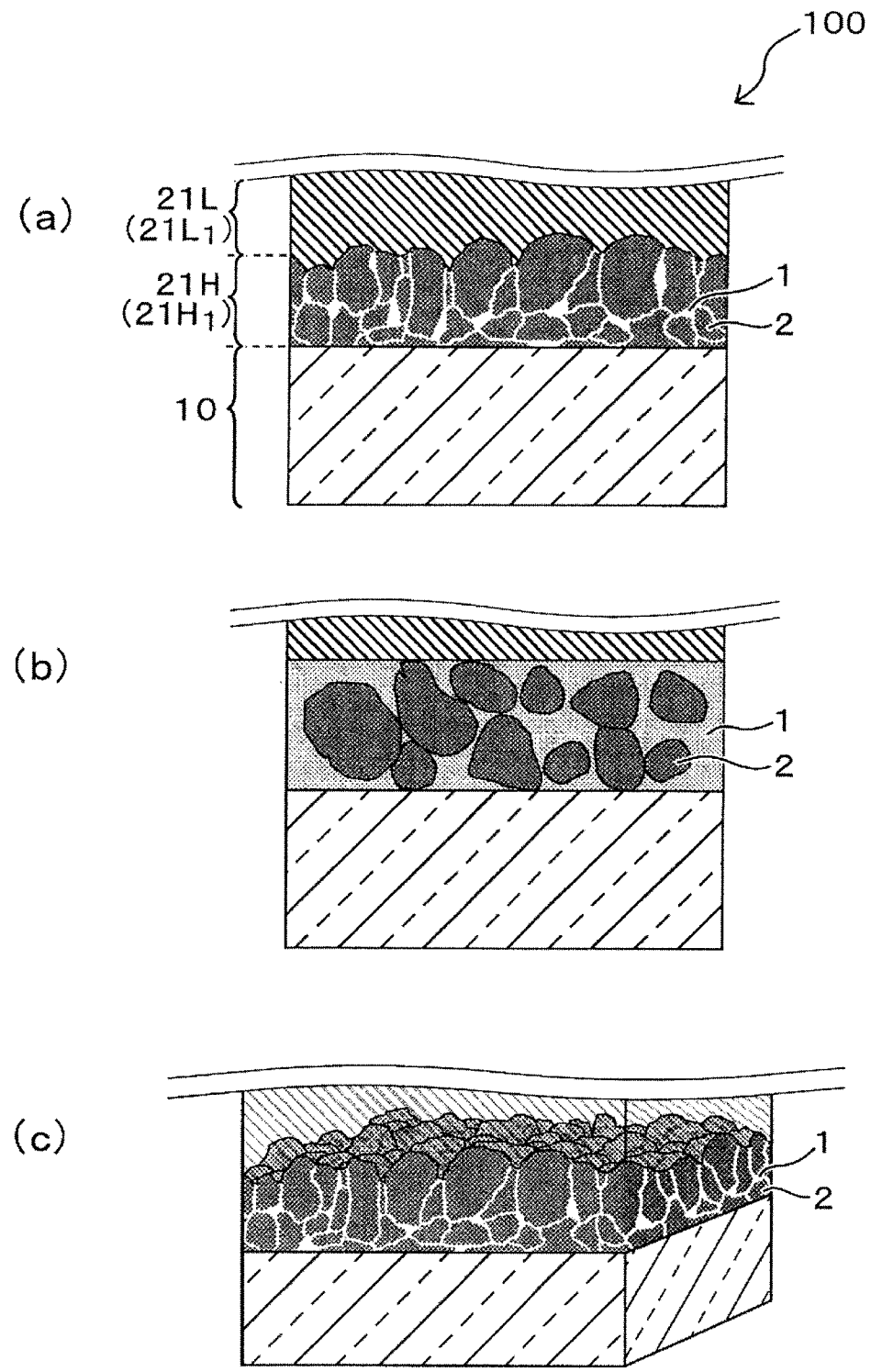
FIGS. 2(a) to 2(c) are schematic cross-sectional views each showing high refractive index layer having a fissured structure according to an embodiment of the present disclosure.

According to an embodiment of the present disclosure, the high refractive index layer 21H may have such a form that an elongate part 1 of low molecular density (i.e., the fissured structure 1) is present between respective ones of high molecular density parts 2 (see FIG. 2(a)). That is, a rift part, which is in an elongated form in a cross-sectional view, may be present in the high refractive index layer. According to another embodiment of the present disclosure, the high refractive index layer may have a form of an islands-in-the-sea as if the low molecular density part 1 constitutes a matrix and the high molecular density parts 2 constitute domains in the matrix (see FIG. 2(b)). According to still another embodiment of the present disclosure, the high refractive index layer 21H may have both of the above forms.

The fissured structure 1 of the high refractive index layer 21H may be provided in at least one cross section of the optical element 100 (see FIGS. 2(a) and 2(b)). Alternatively, the fissured structure 1 of the high refractive index layer 21H may be provided in an arbitrary cross section of the optical element 100 (see FIG. 2(c)). For example, the high refractive index layer 21H may have the fissured structure 1 in both of two cross-sectional views of the optical element 100, the two cross-sectional views being orthogonal to each other, and/or may thus have the fissured structure 1 in both of a cross-sectional view and a plan-sectional view of the optical element 100. The fissured structure 1 of the high refractive index layer 21H is provided preferably in the arbitrary cross section of the optical element 100 because of an isotropic absorption of the stress as well as more provision of such fissure structures. That is, the fissured structure may be distributed throughout the high refractive index layer concerned according to a preferred embodiment of the present disclosure.

The high molecular density parts of the high refractive index layer concerned may be in connection with each other, or may be in divided form as a plurality of segments due to the fissured structure (that is, due to the presence of the low molecular density part). It is preferred that the high molecular density part of the high refractive index layer has the divided form as a plurality of separate segments of the layer from the viewpoint of providing more fissured form of the layer.

As can be seen from FIGS. 1 and 2(a) to 2(c), the high refractive index layer 21H may have such a rift form that the layer fissure part 1 is interposed in the region of the high molecular density part 2. In some embodiments, the layer fissure part 1 extends at least along the layer thickness direction in a cross-sectional view. For example, due to the low molecular density part 1 extending in the direction of layer thickness, the high molecular density parts 2 are distributed in a grainy manner throughout the high refractive index layer 21H. In brief, the low molecular density part 1 may be in a form of a boundary or grain boundary in the high refractive index layer 21H.

The low molecular density part in the high refractive index layer may or may not comprise the $Ta_2O_5$. Alternatively, the low molecular density part in the high refractive index layer may be in a form of voids that is attributable to the process of manufacturing the high refractive index layer. From the viewpoint of the optical characteristics and strength of the high refractive index layer, it is preferred that the low molecular density part comprises the $Ta_2O_5$ in the high refractive index layer.

The form of the "fissured structure" according to the present disclosure can be one observed from an image took by the use of a transmission electron microscope, i.e., TEM (model JEM-2800 manufactured by JEOL Ltd.), the image being one for showing a cross-sectional or plan-sectional cutout section of the optical element, the section being obtained by a focused ion beam device (model FB2200 manufactured by Hitachi Ltd.) with an acceleration voltage of 10 KV to 40 KV.

In the TEM image of the cross-sectional view of the optical element, the "fissured structure" can be relatively light/pale in color as the low molecular density part which is present between relatively dark colored parts as the high molecular density part, the relatively light/pale and the relatively dark being a contrast to each other. The voltage conditions for the TEM image of the cross-sectional view may be adjusted, and/or the image of such cross-sectional view may be adjusted such that the contrast between the high molecular density part and the low molecular density part can be more realized.

The term "fissured structure" as used herein may refer to a part that has an elongate form (i.e., rift part) in the high refractive index layer. In a narrower sense, the term "fissured structure" refers to a layer structure whose rift part can correspond to the low molecular density part having a length dimension of 3 nm or more. Such length dimension of 3 nm or more allow a stress generated in the optical element to be absorbed by the low molecular density part. The length dimension of the low molecular density part as the rift part is preferably 5 nm or more, for example 10 nm or more.

The above length dimension of the low molecular density part in the fissured structure may be one measured on the basis of the TEM image of the cross-sectional view as described above. For example, such dimension may be the longest length of the low molecular density part, measured on the basis of the TEM image of the cross-sectional view having the width dimension of 3 μm or less (e.g., the TEM image provided by taking a region having a width dimension of about 150 nm).

Specifically, the longest length of the low molecular density part may be measured as one that can be drawn between two points in such low molecular density part 1 (for example, drawn as a straight line or curved line connecting these two points with the shortest distance). In a case where the low molecular density part 1 has a branched form, the longest length of the low molecular density part may be one measured as the sum of the longest lengths of the respective branches.

Such measurement may be based on five or more of the TEM images of the cross-sectional view, in which case the fissured structure can be regarded as one having the length dimension of 3 nm or more for the low molecular density part in all the five or more measurements.

In the optical element 100 of the present disclosure, the first high refractive index layer 21H₁ having the fissured structure 1 is located most closely to the base material 10 (see FIG. 1). Accordingly, when the base material 10 is subjected to its volume change, a stress of the first high refractive index layer 21H₁, which may be generated in the first high refractive index layer 21H₁ due to the resulting larger external force derived from the volume-changed base material, can be reduced more effectively. This can particularly lead to a prevention of the crack or the peeling/delamination of the optical multi-layered part 21.

Figure 3:
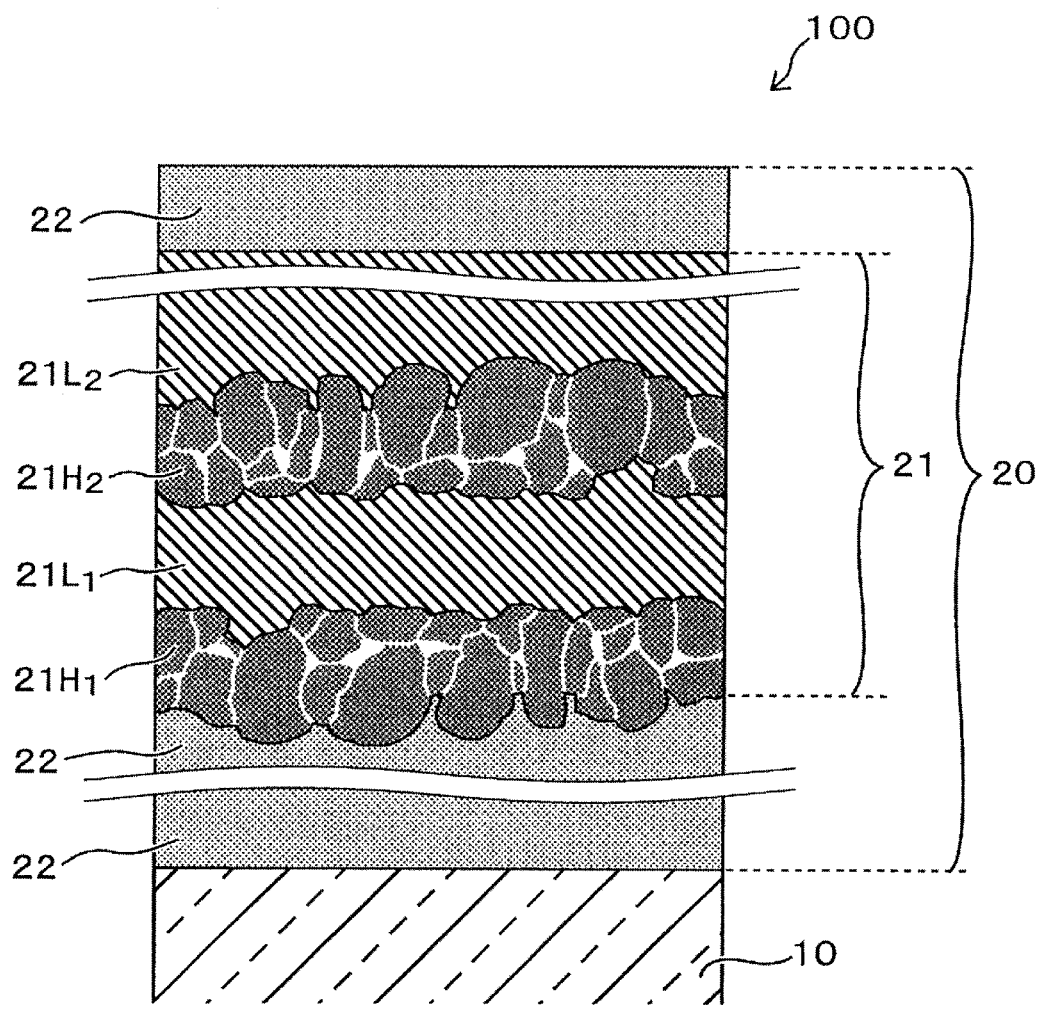
FIG. 3 is a schematic cross-sectional view showing an optical element according to another embodiment of the present disclosure.

The first high refractive index layer 21H₁ having the fissured structure 1 may be in direct contact with the base material 10 (see FIG. 1). Alternatively, an additional layer 22 may be present between the first high refractive index layer 21H₁ having the fissured structure 1 and the base material 10 (see FIG. 3). From the viewpoint of more effectively reducing the stress of the stack covering 20 as a whole, it is preferred that the first high refractive index layer 21H₁ having the fissured structure 1 is in direct contact with the base material 10. In such case where the base material 10 and the first high refractive index layer 21H₁ are in contact with each other, the first high refractive index layer 21H₁ may have a structure 1 of a row form wherein each row extends upward from the base material 10 in a cross-sectional view.

According to an embodiment of the present disclosure, a second high refractive index layer corresponding to one among the high refractive index layers, which is situated most closely to the first high refractive index layer, also has a fissured structure. In the exemplary embodiment shown in FIG. 1, as layers provided as ones of the high refractive index layers 21H, the first high refractive index layer 21H₁ and the second high refractive index layer 21H₂ being situated most closely to the first high refractive index layer 21H₁ each have the fissured structure. Preferably, the first high refractive index layer 21H₁ having the fissured structure is in direct contact with the base material 10, and the second high refractive index layer 21H₂ which is situated most closely to the base material 10 as a layer of other than the first high refractive index layer 21H₁ also has the fissured structure.

Due to the presence of the fissured structure formed in the second high refractive index layer 21H₂, the film density of such layer 21H₂ can be reduced and the rigidity thereof can be lowered, which makes it possible for the second high refractive index layer 21H₂ to prevent the crack from occurring therein. Such fissured structure can also serve to reduce the stress generated in the first high refractive index layer 21H₁, and thereby the crack of the layer 21H₁ can also be prevented.

When the optical multi-layered part has three or more high refractive index layers, it is preferred that all of these three or more high refractive index layers each have the fissured structure from the viewpoint of more reducing the stress of the stack covering 20 as a whole.

In an embodiment of the present disclosure, the high refractive index layer having the fissured structure has a plurality of separate segments due to the fissured structure. In the exemplary embodiments shown in FIGS. 2(*a*) and 2(*b*), the high refractive index layer 21H has a divided form wherein a plurality of the segments 2 (i.e., high molecular density parts 2) are provided by the fissured structure 1 (i.e., by the presence of the low molecular density part 1).

The separate segments 2 attributed to the fissured structure may be those observed from the TEM image of the cross-sectional view as described above. Specifically, each of the segments which have the relatively dark in color may be surrounded by the rift part having the relatively light/pale in color.

With such segmented form, the fissured structures can be more provided, and thereby facilitating the rigidity of the high refractive index layer to be lowered. In addition, the stresses that may be generated in the respective separate segments of the high refractive index layer can be dispersed/offset in various directions by the rift part that is present between such segments. This means that the stress, which may be generated in the optical multi-layered part, can be more effectively reduced, and thereby particularly leading to the prevention of the crack or the peeling/delamination of the optical multi-layered part.

Regarding the above embodiment, it is preferred that the segments each preferably have a diameter of 5 nm to 25 nm. When the segment diameter is 5 nm or more, the rift part between the segments can become larger, and the stress generated in the high refractive index layer can be reduced more effectively. This makes it possible for the high refractive index layer to more effectively prevent the crack from occurring therein. When the segment diameter is 25 nm or less, the segments can be more distributed in the high refractive index layer. This makes it possible for the high refractive index layer to more effectively disperse the stress generated therein. This also makes it possible for the high refractive index layer to suppress the crack or the peeling/delamination attributed to the temperature and/or humidity changes from occurring therein.

In an embodiment of the present disclosure, the boundary between the high refractive index layer having the fissured structure and the low refractive index layer in direct contact therewith (i.e., in direct contact with such high refractive index layer) has an uneven contour in a cross-sectional view of the optical element. The maximum height of the uneven contour may be in the range of 2 nm to 10 nm. When the maximum height of the unevenness is 2 nm or more, the stress can be easily dispersed in the low refractive index layer, and thereby the crack of the high refractive index layer can be prevented more effectively. When the maximum height of the unevenness is 10 nm or less, it becomes easy to suppress an unintended reflection of light so that the transparency of the optical element can be more suitably maintained.

The above "segment diameter" and the above "maximum height of the uneven contour" may be those measured from the TEM image of the cross-sectional view as described above. For example, the segment diameter and the maximum height of the uneven contour may be measured from the TEM image of the cross-sectional view having a width dimension of 3 μm or less (for example, they may be measured from the TEM image given by taking a region having a width dimension of about 150 nm).

Figure 4:
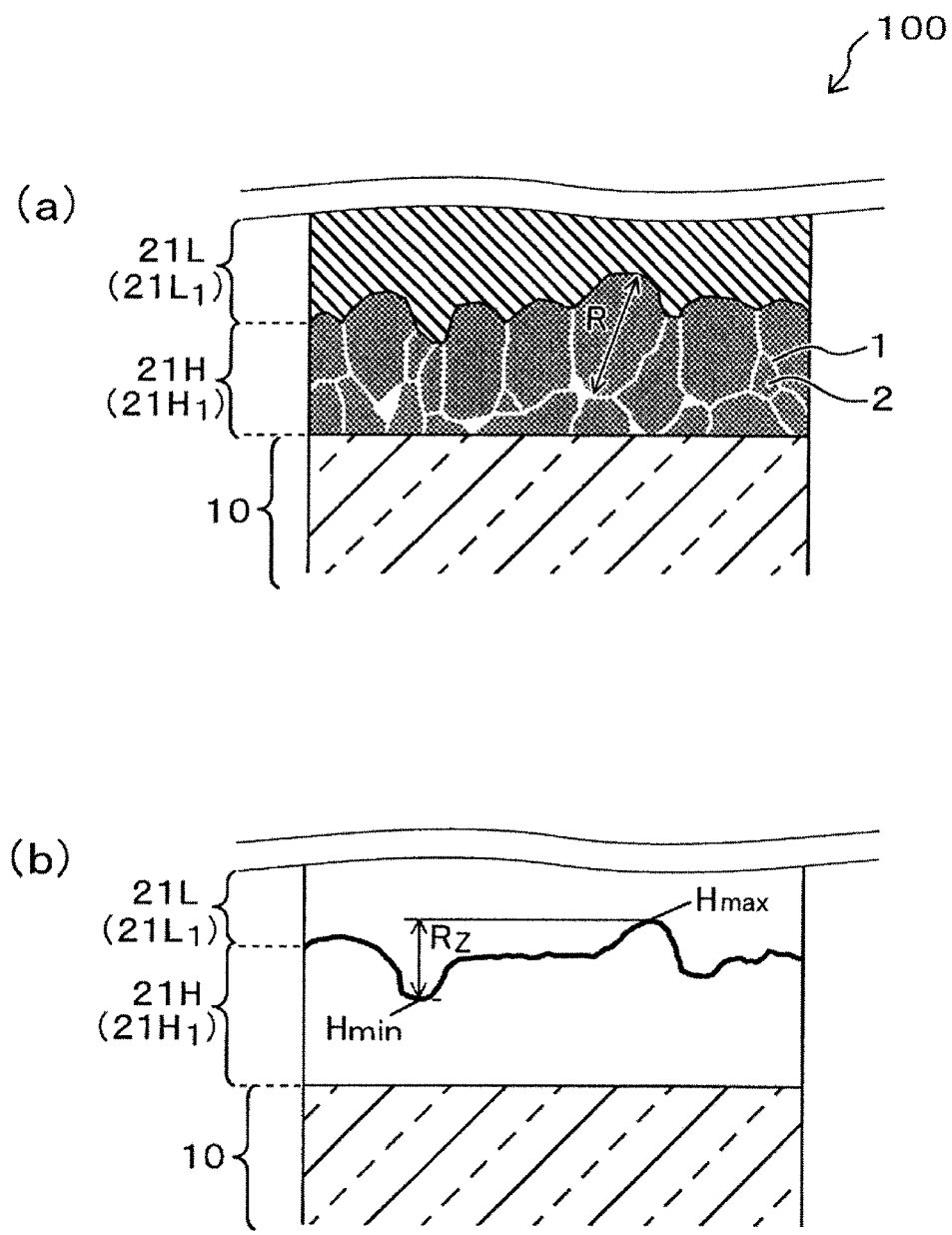
FIGS. 4(a) and 4(b) are schematic cross-sectional views of an optical element according to one embodiment of the present disclosure, the views being for explaining the diameter of a segment in a fissured structure, and the maximum height of boundary unevenness associated with the fissured structure.

Specifically, the segment diameter may be a length dimension of the longest straight line that can be drawn between two points in the one segment 2 having the relatively dark in color located inside the rift part of the fissured structure 1 having the relatively light/pale in color. In this regard, such length dimension can be one as the longest diameter "R" in FIG. 4(*a*).

The maximum height of the uneven contour may be one measured as the difference Rz between the maximum height $H_{max}$ and the minimum height $H_{min}$ in the uneven contour defined as the boundary between the high refractive index layer (e.g., the first high refractive index layer $21H_1$) and the low refractive index layer being in direct contact therewith (see FIG. 4(b)). As one example, the maximum height $H_{max}$ and the minimum height $H_{min}$ may be determined with respect to the surface boundary of the base material 10 as a reference line. That is, the maximum distance from the upper surface of the base material 10 to the uneven contour in the layer thickness direction can correspond to the "maximum height $H_{max}$", and the minimum distance thereof can correspond to the "minimum height $H_{min}$".

In the optical multi-layered part 21 of the optical element 100 according to the present disclosure, a surface reflection of visible light in a wavelength region of approximately 400 nm to 700 nm can be canceled by the alternate stacking of the high refractive index layer 21H and the low refractive index layer 21L (see FIG. 1).

The optical multi-layered part 21 as described above makes it possible to prevent a light reflection of an unintended wavelength on the surface of the optical element 100. Accordingly, when the optical element of the present disclosure is used as an optical lens for a camera, a lens for an optical sensor, and the like, desired characteristics of the lens (for example, transparency, sensor accuracy, etc.) can be ensured.

In the optical multi-layered part 21, the high refractive index layer 21H and the low refractive index layer 21L may be alternately stacked on each other such that the optical multi-layered part 21 has four layers or more and fifty layers or less, for example. When the number of the stacked layers is 4 or more, a larger stress can be brought about in the optical multi-layered part, which particularly leads to a greater effectiveness of the fissured structure of the high refractive index layer according to the present disclosure. Further, the stacked layers as 4 or more layers make it possible to more effectively to give the desired optical characteristics. While on the other hand, when the number of the layers stacked is 50 or less, the reduced thickness of the optical element as a whole can be provided.

The high refractive index layer 21H comprises the $Ta_2O_5$ so that a film having a high refractive index and a high heat resistance and also having a high smoothness can be given. The high refractive index layer 21H may further comprise other metal oxide and/or a binder (e.g., a resin). The content of $Ta_2O_5$ in the high refractive index layer 21H is preferably 50% by weight or more, and for example 90% by weight or more. From the viewpoint of suppressing the surface reflection of light having the visible light wavelength region, the refractive index of the high refractive index layer 21H is preferably more than 1.7 and 2.3 or less.

The low refractive index layer 21L comprises the $SiO_2$ in terms of a high transparency and an ease of adjusting the refractive index. The low refractive index layer 21L may further comprise a binder such as a resin material. The content of $SiO_2$ in the low refractive index layer 21L is preferably 50% by weight or more, and for example 90% by weight or more. From the viewpoint of suppressing the surface reflection of light having the visible light wavelength region, the refractive index of the low refractive index layer 21L is preferably 1.1 or more and less than 1.6.

In an embodiment of the present disclosure, the thickness of the optical multi-layered part 21 in the optical element is 200 nm or more (see FIG. 1). The thickness of 200 nm or more makes it possible to more effectively provide the desired optical characteristics, achieve a better friction resistance upon physical contact, and give a better durability against corrosion fatigue.

It is preferred that the thickness dimensions of each high refractive index layer 21H and each low refractive index layer 21L are respectively 5 nm to 300 nm from the viewpoints of the optical characteristics and the reduced thickness.

In an embodiment of the present disclosure, the thickness dimension of the first high refractive index layer is in the range of 10 nm to 90 nm. When the thickness dimension is 10 nm or more, the surface reflection regarding the base material can be more effectively suppressed. When the thickness dimension is 90 nm or less, it becomes easy to reduce the stress of the entire of the stack covering. In some embodiments, the thickness dimension of the first high refractive index layer is in the range of 10 nm to 70 nm, 10 nm to 60 nm, 10 nm to 50 nm, or the like.

In an embodiment of the present disclosure, the thickness dimension of the second high refractive index layer that is situated most closely to the first high refractive index layer is larger than the thickness dimension of such first high refractive index layer. This makes it possible to lower the stress of the entire stack covering by the second high refractive index layer as a relatively thick layer, while more effectively suppressing the surface reflection regarding the base material by the first high refractive index layer as a relatively thin layer. For example, the thickness dimension of the first high refractive index layer may be in the range of 10 nm to 90 nm, whereas the thickness dimension of the second high refractive index layer may be in the range of 95 nm to 200 nm, 95 nm to 170 nm, 95 nm to 160 nm, or the like.

For the base material of the optical element according to an embodiment of the present disclosure, various kinds of resin materials can be used as raw materials. Examples of such resin material include, but are not particularly limited to, polycarbonate, cycloolefin polymer, cycloolefin copolymer, methyl methacrylate homopolymer, copolymer of methyl methacrylate with one or more other monomer(s), diethylene glycol bisallyl carbonate homopolymer, copolymer of diethylene glycol bisallyl carbonate with one or more other monomer(s), sulfur-containing copolymers, halogen-containing copolymers, polystyrene, polyvinyl chloride, unsaturated polyesters, polyethylene terephthalate, polyurethane, and/or PMMA (acrylic). The refractive index of the resin material is preferably, but is not particularly limited to, in the range of 1.40 to 1.80.

In an embodiment of the present disclosure, the base material of the optical element comprises at least one selected from the group consisting of polycarbonate, cycloolefin polymer and cycloolefin copolymer. Such resin material of the base material makes it easier to allow the optical element to be superior in its transparency and durability under the condition of high temperature and high humidity.

The thickness of the base material of the optical element according to the present disclosure is preferably, but is not particularly limited to, in the range of 0.01 mm to 30 mm, and for example 0.1 mm to 15 mm.

In an embodiment of the present disclosure, the average reflectance in the visible light region is 1% or less. Such reflectance of 1% or less makes it possible to achieve an increased transmission amount of light, higher contrast and/or removal of a ghost image in the optical element, which leads to the further improved efficiency of the optical element.

The term "average reflectance in the visible light region" may refer to an average value of the light ray reflectance at the wavelength region of 400 nm to 700 nm. Such average reflectance may be a value measured using a reflectance analyzer (model USPM-RU manufactured by OLYMPUS Corporation). Specifically, the spectral reflectance at the wavelength range of 400 nm to 700 nm may be measured with the light incident angle as 0 degree with respect to the surface of the stack covering of the optical element to calculate the wavelength-average value in such range.

The stack covering in the optical element according to the present disclosure may further comprise at least one additional layer selected from the group consisting of an antifouling layer, a water-repellent layer, a hydrophilic layer, an anti-fogging layer, a hard coating layer and a primer layer. The additional layer 22 may be positioned on or above the optical multi-layered part 21 in the stacking direction of the stack covering 20 (see FIGS. 1 and 3), or it may be positioned under or below the optical multi-layered part 21 in the stacking direction of the stack covering 20 (see FIG. 3). In a case where the additional layer 22 is the antifouling layer, the anti-fogging layer or the hard coating layer, such additional layer is preferably positioned at the outermost surface of the optical element 100. In a case where the additional layer 22 is the primer layer, such additional layer is preferably positioned between the optical multi-layered part 21 and another additional layer 22.

According to the present disclosure, the antifouling layer and/or the water-repellent layer may comprise a fluorine-containing compound for example. As the fluorine-containing compound, any suitable compounds may be used, without particular limitation, as long as it gives antifouling property, water repellency and/or oil repellency.

According to the present disclosure, the hydrophilic layer may comprise an organometallic compound as a main component of the layer. As the organometallic compound, any suitable compounds may be used, without particular limitation, as long as it has a low contact angle with respect to water (for example, the low contact angle of 20° or less) and is capable of removing water droplets which have adhered to the surface of the optical element.

According to the present disclosure, the anti-fogging layer may comprise a compound such as metal oxides and metal fluorides. As such compound of the anti-fogging layer, any suitable compounds may be used, without particular limitation, as long as it suppresses some fogging (for example, the fogging such as a colored interference color and a colored double image) regarding the surface of the optical element.

According to the present disclosure, the hard coating layer may comprise a composition of a thermosetting resin and/or an ultraviolet curable resin. As the compound of the hard coating layer, any suitable compositions may be used, without particular limitation as long as it gives sufficient hardness for the surface of the optical element.

According to the present disclosure, the primer layer may comprise a resin composition of polycarbonate, urethane and/or polyester. As the compound of the primer layer, any suitable compositions may be used, without particular limitation, as long as it gives an adhesion of the optical element and/or an adhesion between layers of the stack covering (for example, the adhesion regarding the optical element and the optical multi-layered part).

According to the present disclosure, a method for forming the stack covering is, but not particularly limited to, based on an application process with respect to the base material by a conventional method such as a vacuum vapor deposition (including a heat vapor deposition and/or an ion-assisted vapor deposition), a plasma deposition, a reactive sputtering and/or a wet coating (e.g., a spin, flow coat, a dipping, a spray and/or inkjet). The formation for respective layers of the stack covering may be performed continuously through the same method for all the layers, or may be performed separately layer by layer through the same or different method.

In an embodiment of the present disclosure, the vacuum vapor deposition which is superior in an accuracy of film thickness and is particularly easier to give the fissured structure is preferably performed for the formation of the stack covering. In a case where the stack covering is formed by the vacuum vapor deposition, the film formation temperature of a substrate is preferably 20° C. or higher and 200° C. or lower, and for example 70° C. or higher and 150° C. or lower, from the viewpoint of more facilitating the formation of the fissured structure.

The high refractive index layer having the fissured structure may be formed by controlling a degree of vacuum in a vapor deposition apparatus and thereby adjusting a density of the layer (i.e., the molecular density of the layer material). For example, the degree of vacuum in the vapor deposition apparatus may be lowered to form the high refractive index layer having the fissured structure with the relatively low molecular density. Specifically, an operation of lowering the degree of vacuum in the vapor deposition apparatus may be performed to allow the high refractive index layer to have the low molecular density part with the relatively low molecular density of $Ta_2O_5$ that is located between the high molecular density parts with the relatively high molecular density of $Ta_2O_5$.

The degree of vacuum in the vapor deposition apparatus is preferably in the range of 1.0E-2 Pa to 6.0E-2 Pa, and for example 2.0E-2 Pa to 6.0E-2 Pa. Such degree of vacuum can be controlled by adjusting the flow rate of gas (e.g., oxygen ($O_2$) gas) introduced into the vapor deposition apparatus. In this method that involves the adjusting of the degree of vacuum by the introduction of the gas into the vapor deposition apparatus, gas(es) other than the oxygen gas, such as argon gas, may also be used.

In a case where the optical multi-layered part is formed by the vacuum vapor deposition method, an oxygen deficiency may occur partially in the high refractive index layer. This phenomenon can also occur even when a $SiO_2$ film is formed on the surface of the high refractive index layer made of $Ta_2O_5$ in the present disclosure. In order to compensate for such oxygen deficiency, it is preferable to at least partly use the oxygen gas.

With respect to the high refractive index layer having the fissured structure, it may be formed by adjusting the amount of a high refractive index layer material to be charged into the vapor deposition apparatus (for example, by adjusting the volume of such material, and/or the blending composition of the materials) and/or by varying an irradiation amount with respect to the material (for example, by varying the energy for vaporizing the material).

The base material for the optical element according to the present disclosure is shaped by any suitable methods such as an injection molding, a machining, a grinding/polishing, a laser machining, an electric discharge machining, and/or an edging. From the viewpoints of manufacturing cost, mass productivity and/or processability, it is more preferable that the injection molding is performed for the formation of the base material for the optical element.

Figure 5:
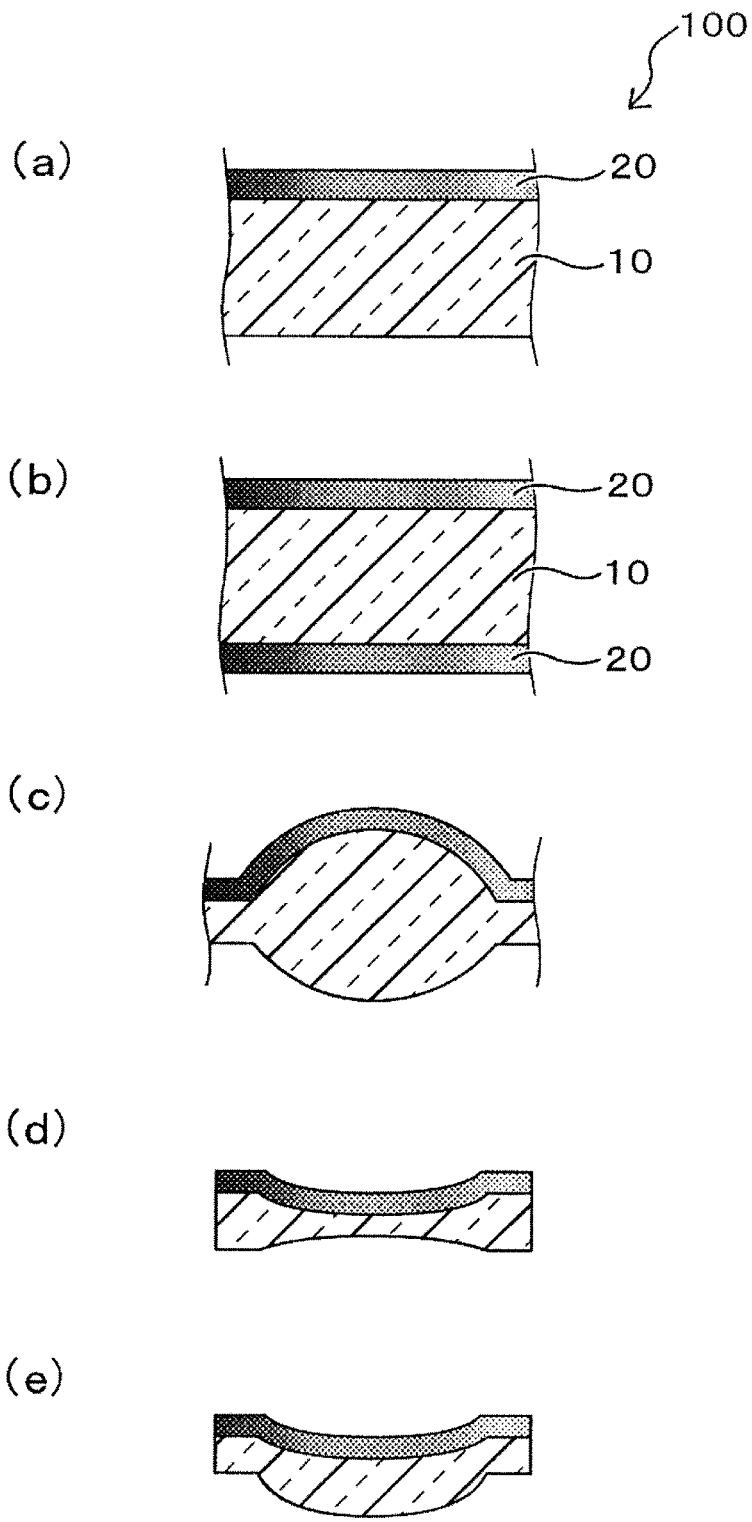
FIGS. 5(a) to 5(e) are cross-sectional views schematically showing various embodiments of an optical element according to the present disclosure.

The surface of the optical element 100 may be either a flat surface as shown in FIGS. 5(a) and 5(b), or a curved surface as if the element provides a lens as shown in FIG. 5(c). In the optical element 100, the stack covering 20 may be provided onto only one of the surfaces of the base material 10 (see FIG. 5(a)). Alternatively, the stack covering 20 may be provided onto both of the two opposing surfaces of the base material 10 (see FIG. 5(b)). The type of lens may be, but is not particularly limited to, a convex lens, a concave lens, or the like. The convex lens may be a biconvex lens (FIG. 5(c)) or a planoconvex lens. The concave lens may be a biconcave lens (FIG. 5(d)) or a planoconcave lens. The lens may also be a meniscus lens as illustrated in FIG. 5(e).

The optical element may be shaped to have a shape suitable for its application. For example, the shape of the optical element is a plate-like shape that is suitable for an optical filter, an infrared transmission window, etc. While on the other hand, the shape of the optical element is, for example, a concave-convex shape (e.g., biconcave shape, biconvex shape, etc.) that is suitable for a lens for imaging applications. In order to shape a material into a form of the optical element, any suitable processes may be employed, such as a grinding/polishing and/or a press molding.

In a case where the optical element is a lens, it may be formed from a material through a mold-press molding, for example. Such molding method will be described as an example. First, the material is pre-shaped into a substantially final shape in advance by an injection molding. Next, the pre-shaped material is put into a cavity of a mold for forming optical element, the mold having been heated at or above a deflection temperature under load and below a glass transition temperature regarding the material. Thereafter, when the temperature of the material becomes substantially the same as that of the mold for forming optical element and thus becomes equal to or higher than the deflection temperature under load and also becomes less than the glass transition temperature, the material is pressed by lowing a press head while the material is deformed thereby. Thereafter, the pressing force is released, and the temperature is cooled to the deflection temperature under load to take the shaped optical element from the mold. This can be obtained an optical element having the desired shape (e.g., a lens shape).

The optical element according to the present disclosure may be a lens for at least transmitting visible light. Since the optical element of the present disclosure has a superior antiweatherability, it may be used as an imaging lens or the like to be installed particularly outdoors. For example, the optical element according to the present disclosure may be a lens to be used for a camera in a surveillance system for disaster prevention/crime prevention, and/or a vehicle-mounted camera that is installed particularly outside the vehicle, such as a view camera/sensing camera.

Since the optical element according to the present disclosure is superior in durability under the high temperature and the high humidity, it can be used as a lens or a cover glass to be used for particular applications wherein it is located in the proximity of a heat-generating element (e.g., an imaging element, a projection element, a light source, etc.).

For example, the optical element according to the present disclosure may be a lens to be used in a compacted optical unit. Specifically, the "compacted optical unit" used herein may refer to an optical unit such as a head-mounted display and a head-up display.

Figure 6:
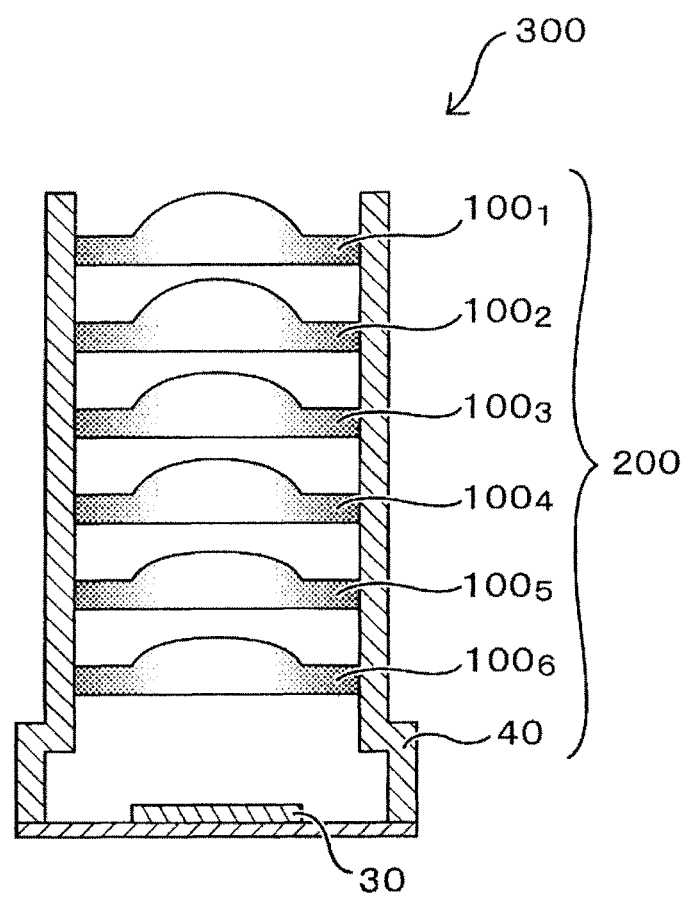
FIG. 6 is a schematic cross-sectional view showing a module in which an optical element according to the present disclosure is used.

As an exemplary embodiment, FIG. 6 illustrates a module (e.g., a camera module or a sensor module) 300 composed of an optical element lens barrel 200 wherein six optical elements $100_1$ to $100_6$ are contained in a holder thereof, and an imaging element 30. The optical element according to the present disclosure can be particularly preferably used in a module 300 as optical elements $100_1$ and $100_2$ that are particularly located outside, and/or as optical elements $100_5$ and $100_6$ that are particularly located in the proximity of the imaging element 30.

EXAMPLES

Hereinafter, the present disclosure will be described with reference to examples, but the present disclosure is not limited to these examples.

[Manufacturing of Optical Element of the Present Disclosure]

Example 1

First, a base material 10 made of polycarbonate (trade name: Iupizeta (registered trademark) EP series, manufactured by Mitsubishi Gas Chemical Company, Inc., refractive index: 1.5 to 1.7) was dried at about 120° C. for about 12 hours (see FIG. 1).

Next, the base material 10 was put into a vapor deposition apparatus. With a degree of vacuum set to 2.0E-2 Pa to 3.5E-2 Pa and a substrate temperature set to 100° C. to 120° C., high refractive index layers 21H (i.e., $21H_1$ and $21H_2$) and low refractive index layers 21L (i.e., $21L_1$ and $21L_2$) were alternately stacked on each other such that the resulting stacking of four or more layers was given in total by a vacuum vapor deposition method. Through this stacking, an optical multi-layered part 21 was formed on one surface of the base material 10, and thereby an optical element 100 of Example 1 was provided.

For the high refractive index layer 21H, a material containing 85% by weight or more of $Ta_2O_5$ was used. For the low refractive index layer 21L, a material containing 90% by weight or more of $SiO_2$ was used. The refractive index and thickness of each layer were adjusted ones within the ranges shown in Table 1 such that desired antireflection function was given in the optical element. The physical property values of the respective layers are shown in Table 1. The refractive indices in Table 1 are ones measured at 500 nm.

TABLE 1

| Layer | Layer material (main component) | Refractive Index [—] | Thickness [nm] |
|---|---|---|---|
| Base material 10 | Polycarbonate | 1.5-1.7 | — |
| First high refractive index layer $21H_1$ | $Ta_2O_5$ | 1.9-2.2 | 10-40 |
| First low refractive index layer $21L_1$ | $SiO_2$ | 1.4-1.5 | 10-40 |
| Second high refractive index layer $21H_2$ | $Ta_2O_5$ | 1.9-2.2 | 100-150 |
| Second low refractive index layer $21L_2$ | $SiO_2$ | 1.4-1.5 | 70-100 |

Example 2

The optical element of Example 2 was manufactured in the same manner as in Example 1 except that the degree of vacuum in the vapor deposition apparatus was 3.5E-2 Pa to 4.0E-2 Pa.

Comparative Example

The optical element of Comparative example was manufactured in the same manner as in Example 1 except that the degree of vacuum in the vapor deposition apparatus was 8.0E-3 Pa to 1.9E-2 Pa.

Analysis for the cross section of the first high refractive index layer in each sample of the optical elements obtained from the above was performed using a transmission electron microscope, i.e., TEM. First, a cross-sectional cutout section of each of the optical elements of Examples 1 and 2 and Comparative example was produced by a focused ion beam device (model FB2200 manufactured by Hitachi, Ltd.) with an acceleration voltage of 10 KV to 40 KV. Next, a TEM image of the cross-sectional view regarding the first high refractive index layer was observed using the transmission electron microscope (TEM) (model JEM-2800 manufactured by JEOL Ltd.) with a magnification of 1000000 times (see FIGS. 7(a)-7(c)).

Figure 7:
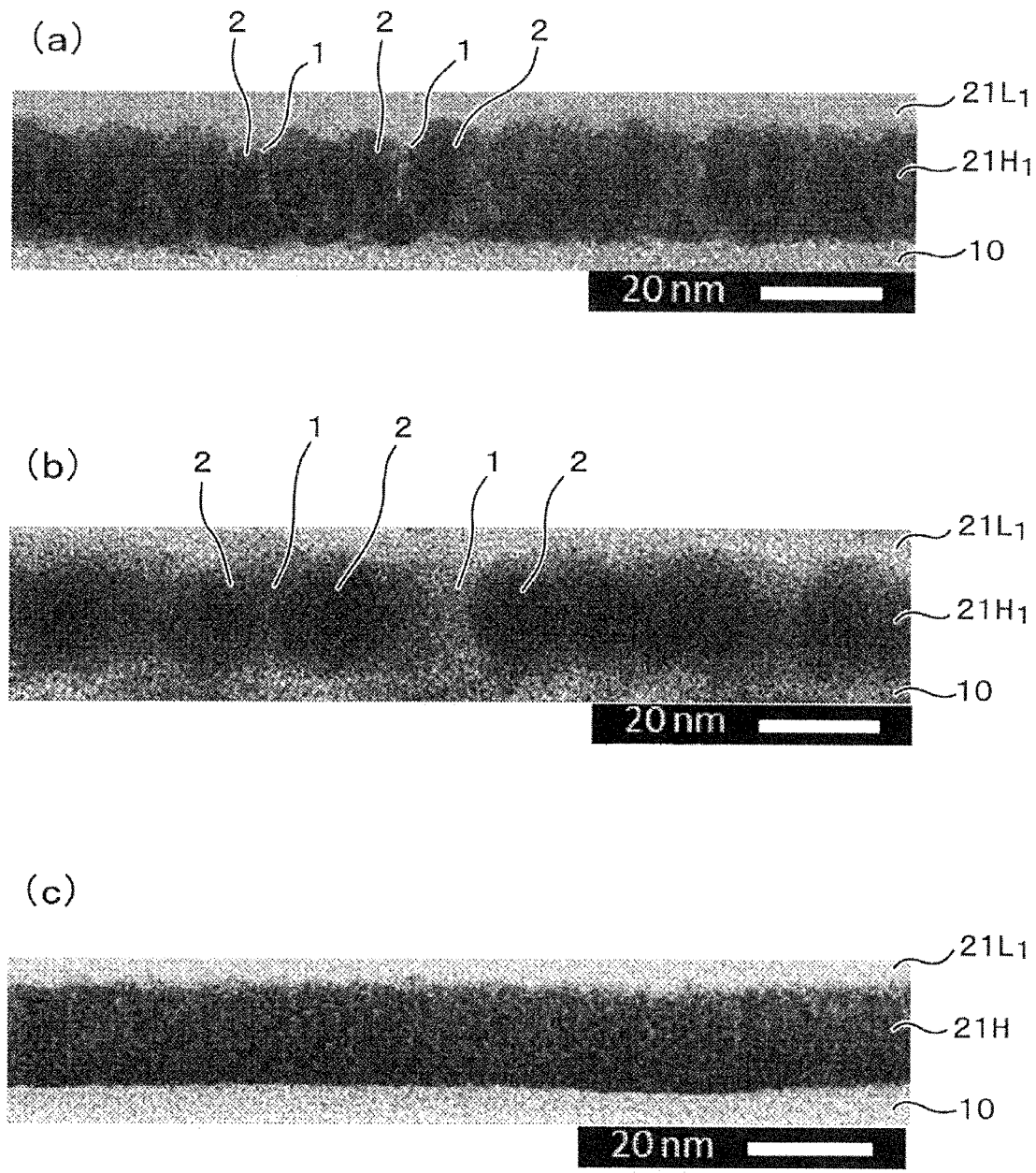
FIGS. 7(a) to 7(c) are cross-sectional TEM images of optical elements in Examples according to the present disclosure and Comparative example, each of the images being taken by a transmission electron microscope (TEM) at a magnification of 1000000 times.

As shown in FIG. 7(a), it was confirmed that the optical element had the fissured structure in its first high refractive index layer $21H_1$ that was situated most closely to the base material. More specifically, as for the first high refractive index layer $21H_1$ of Example 1, it was confirmed that the rift part having an elongated form (i.e., a low molecular density part) had been formed between the segments 2 (i.e., high molecular density parts 2) as the fissured structure 1.

Further, it was confirmed also in Example 2 that the optical element had the fissured structure in the first high refractive index layer $21H_1$ that was situated most closely to the base material. More specifically, as for the first high refractive index layer $21H_1$ of Example 2, it was confirmed that the fissured structure 1 had an islands-in-the-sea form in which a matrix and segments 2 as domains therein are provided (see FIG. 7(b)). In other words, the first high refractive index layer $21H_1$ had a plurality of separate segments 2 due to the fissured structure 1.

While on the other hand, the optical element in Comparative example did not have the fissured structure in the first high refractive index layer $21H_1$ that was situated most closely to the base material. More specifically, as for the first high refractive index layer $21H_1$ of Comparative example, a layer structure in its dense form was confirmed, and no fissured structure was confirmed. Such no fissured structure was confirmed even when the high contrast of the first high refractive index layer $21H_1$ was given with respect to the base material 10 and the low refractive index layer $21L_1$ (see FIG. 7(c)).

Based on FIG. 7(b), the segment diameter and the maximum height of the uneven contour in the first high refractive index layer $21H_1$ were analyzed. As a result, it was confirmed in FIG. 7(b) that the segment diameter was 9 nm to 19 nm, which means it is in the range of 5 nm to 25 nm. It was also confirmed in FIG. 7(b) that the maximum height of the uneven contour was 4 nm to 8 nm, which means it is in the range of 2 nm to 10 nm. Further, as for Examples 1 and 2, it was confirmed that the thickness dimension of the second high refractive index layer that was situated most closely to the first high refractive index layer was larger than the thickness dimension of such first high refractive index layer.

The optical elements of Examples 1 and 2 and Comparative example produced as described above were subjected to a reliability test according to the following.

[Details of Reliability Test]
(Moist Heat Test)

A test for evaluating resistance to degradation attributed to moist heat was conducted by a method in accordance with JIS Standard (JIS C 60068). Specifically, each sample of optical elements of Examples 1 and 2 and Comparative example was left to stand for 3000 hours under the condition of 85° C./85%.

[Evaluation on Reliability Test]

After the above test, the appearance of the each sample was evaluated. Specifically, using a stereomicroscope (model SMZ745T manufactured by Nikon Corporation), an eyepiece (C-W 10× B) and a lighting device (model HDR61WJ/LCD-21 manufactured by Hayashi-Repic Co., Ltd.), the each sample was irradiated with light from its front to visually check the presence of defects such as cracks and peeling/delamination in the optical multi-layered part provided on the surface of the base material.

Of the samples after the above test, no defect was found in both of the samples as for Examples 1 and 2. While on the other hand, the sample of Comparative example had the cracks and the peeling/delamination in the optical multi-layered part thereof.

The results of the above reliability test and evaluation thereof showed that the optical elements according to the present disclosure had the superior weather resistance even under a severer environment.

Although some embodiments of the present invention have been hereinbefore described, they are only for illustrative purpose regarding the typical ones just as an example. The optical element according to the present disclosure and the manufacturing method therefor are not limited to these embodiments. It would be readily appreciated by those skilled in the art that various embodiments are possible.

INDUSTRIAL APPLICABILITY

As described above, the present disclosure can be applied to the field of optical elements that are required to have high visible light transmittance and antiweatherability. Just as an example, the optical element according to the present disclosure can contribute to a realization of various optical units such as imaging units (e.g., a camera lens for a surveillance system for disaster prevention/crime prevention, and a vehicle-mounted camera to be installed outside a vehicle), optical element lens barrel units, and optical pickup units; various optical systems such as high-definition imaging optical systems, objective optical systems, scanning optical systems, and pickup optical systems; imaging devices; optical pickup devices; head-mounted displays; head-up displays; and optical scanning devices.

DESCRIPTION OF REFERENCE NUMERALS

1: Fissured structure (low molecular density part)
2: Segment (high molecular density part)
10: Base material
20: Stack covering
21: Optical multi-layered part (optical thin film)
21H: High refractive index layer
21L: Low refractive index layer
30: Imaging element
40: Holder
100: Optical element
200: Optical element lens barrel
300: Module

The invention claimed is:

1. An optical element, comprising:
a base material and a stack covering of layers disposed on the base material, the base material comprising a resin material, wherein:
the stack covering comprises an optical multi-layered part composed of high refractive index layers each comprising $Ta_2O_5$ and low refractive index layers each comprising $SiO_2$, the high refractive index layers and the low refractive index layers being alternately stacked in a form of 4 to 50 individual layers or, a first high refractive index layer of the high refractive index layers comprises a fissured structure, the first high refractive index layer being situated most closely to the base material, the fissured structure comprises a low molecular density part which is positioned between respective ones of high molecular density parts in the high refractive index layers, the low molecular density part comprises $Ta_2O_5$, and a molecular density of $Ta_2O_5$ of the low molecular density part is lower than a molecular density of $Ta_2O_5$ of each of the high molecular density parts.

2. The optical element according to claim 1, wherein the fissured structure is present in an arbitrary cross section of the optical element.

3. The optical element according to claim 1, wherein the first high refractive index layer is in direct contact with the base material.

4. The optical element according to claim 1, wherein a second high refractive index layer of the high refractive index layers comprises a further fissured structure, the second high refractive index layer being situated most closely to the first high refractive index layer.

5. The optical element according to claim 1, wherein the first high refractive index layer having the fissured structure has a plurality of separate segments due to the fissured structure.

6. The optical element according to claim 5, wherein the segments each have a diameter of 5 nm to 25 nm.

7. The optical element according to claim 1, wherein:

a boundary between the first high refractive index layer having the fissured structure and one of the low refractive index layers, which is in direct contact with the first high refractive index layer, comprises an uneven contour in a cross-sectional view of the optical element, and the uneven contour has a maximum height of 2 nm to 10 nm.

8. The optical element according to claim 1, wherein the first high refractive index layer has a thickness of 10 nm to 90 nm.

9. The optical element according to claim 1, wherein a second high refractive index layer of the high refractive index layers is thicker than the first high refractive index layer, the second high refractive index layer being situated most closely to the first high refractive index layer.

10. The optical element according to claim 1, wherein the base material is made of at least one selected from the group consisting of polycarbonate, cycloolefin polymer and cycloolefin copolymer.

11. The optical element according to claim 1, wherein the optical element has an average reflectance of 1% or lower for a visible light region.

12. The optical element according to claim 1, wherein the stack covering further comprises at least one additional layer selected from the group consisting of an antifouling layer, a water-repellent layer, a hydrophilic layer, an anti-fogging layer, a hard coating layer and a primer layer.

13. The optical element according to claim 1, wherein the optical element is included in a surveillance system or a vehicle.

14. The optical element according to claim 1, wherein the optical element is included in a compacted optical unit.

* * * * *